United States Patent
Myers, II

[11] Patent Number: 6,030,466
[45] Date of Patent: Feb. 29, 2000

[54] PAINT STRIPPING COMPOSITION BASED ON TETRAHYDROFURFURYL ETHERS

[75] Inventor: Marion Mack Myers, II, Milwaukee, Wis.

[73] Assignee: Rust-Oleum Corporation, Pleasant Prairie, Wis.

[21] Appl. No.: 09/276,347

[22] Filed: Mar. 25, 1999

Related U.S. Application Data

[62] Division of application No. 08/848,883, May 1, 1997, abandoned.

[51] Int. Cl.[7] ....................................................... C09D 9/00
[52] U.S. Cl. .............................. 134/38; 510/201; 510/203
[58] Field of Search ..................................... 510/203, 212, 510/201, 407, 500, 501; 134/38

[56] References Cited

U.S. PATENT DOCUMENTS

| | | | |
|---|---|---|---|
| 4,808,497 | 2/1989 | Blomgren et al. | 429/194 |
| 5,456,853 | 10/1995 | Meyers, II | 252/170 |

*Primary Examiner*—Mark Kopec
*Assistant Examiner*—Gregory E. Webb
*Attorney, Agent, or Firm*—Banner & Witcoff, Ltd.

[57] ABSTRACT

Paint stripping compositions that are relatively non-toxic and environmentally safe are disclosed for use in removing, for example, oil base alkyd and latex paints, varnishes, lacquers, shellacs, enamels, polyurethane, and epoxy coatings from wood and metal surfaces at ambient temperatures. Tetrahydrofurfuryl alkyl ethers, alone, or in combination with other ingredients, such as N-methyl-2-pyrrolidone, provide compositions with improved paint stripping properties.

9 Claims, No Drawings

PAINT STRIPPING COMPOSITION BASED ON TETRAHYDROFURFURYL ETHERS

This application is a divisional of application 08/848,883 filed May 1, 1997, now abandoned.

BACKGROUND OF THE INVENTION

1. Field of the Invention

This invention relates to the field of paint-stripping compositions.

2. Description of the Prior Art

The present invention relates generally to improved compositions for paint stripping. Methylene chloride was the principal component of paint stripping compositions for a number of years because of its effectiveness in quickly softening most types of paints. The use of methylene chloride has become disfavored mainly due to its toxicity to humans and the environment.

A number of compounds have been offered as substitutes for methylene chloride. Among the principal compounds that have found to be effective to one degree or another in paint stripping formulations are N-methyl-2-pyrrolidone (NMP), gamma-butyrolactone (BLAC), tetrahydrofurfuryl alcohol (THFA), and furfuryl alcohol (FA). It has also been found that the efficacy of these compounds as paint removers can be improved by using them in combination with one another or with other compounds. For example, FA and THFA have been used in combination (U.S. Pat. No. 4,600,522). U.S. Pat. No. 4,366,002 teaches the use of two of FA, THFA, and a substituted alcohol of FA or THFA.

Oxygenated aliphatic solvents (e.g., glycols, ethers, esters, alcohols, and organic acids) are among the most frequently found additives used in conjunction with the aforementioned compounds. For example, FA has been used in combination with ethoxytriglycol and ethylene glycol phenyl ether (U.S. Pat. No. 3,551,340); NMP and BLAC in combination with ethyl 3-ethoxypropionate (U.S. Pat. No. 5,098,592); NMP in combination with an oxygenated aliphatic solvents (preferably one of the lower alkyl esters of 3-ethoxypropionate, e.g., ethyl 3-ethoxypropionate), wherein THFA may be substituted for part or all of oxygenated aliphatic solvent (U.S. Pat. No. 5,049,314); and NMP and THFA in combination with a variety of ethers, ketones, alcohols, esters (U.S. Pat. Nos. 4,274,884, 4,664,721, and 5,456,853).

Other additives have also been suggested. Amines have been used as accelerators in conjunction with ethoxylated FA, ethoxylated THFA, and NMP (U.S. Pat. No. 4,737,195). Aromatic hydrocarbons (U.S. Pat. No. 4,128,810) and aliphatic hydrocarbons (U.S. Pat. No. 5,015,410) have been used in conjunction with NMP; and organic acids have been used with NMP and BLAC (U.S. Pat. No. 5,035,829). Still others have attempted a two phase system employing glycol phenyl ether, ethoxylated FA, and combinations thereof in an organic phase dispersed in an aqueous phase (U.S. Pat. No. 4,619,706).

Many formulations employing alternatives to methylene chloride suffer from a variety of disadvantages. Those using THFA are preferably used at elevated temperatures on the order of 200° F. because they act too slowly at ambient temperatures. Others are intended for use in baths, where the object to be stripped must be immersed in the bath. Those requiring the use of NMP are expensive due to the relatively high cost of NMP. Furthermore, NMP is derived from non-renewable petroleum sources. Aliphatic dibasic ester based products are too slow and not effective enough. Consequently, it has been desirable to develop an effective paint stripping composition that circumvents these disadvantages without reintroducing the disadvantages posed by methylene chloride paint stripping technology.

SUMMARY OF THE INVENTION

An object of the present invention is to provide a safe and effective paint stripping composition. A further object of the present invention is to provide a paint stripping composition with the following properties: efficacy at ambient temperatures, low flammability, ease of cleaning, water soluble, relatively non-toxic and non-carcinogenic, biodegradable, and environmentally safe. A further object of the present invention is to provide a paint stripping composition that is relatively inexpensive, works quickly and effectively, and is preferably obtained from renewable sources.

It has been known, as disclosed above, that THFA is a useful component in paint stripping compositions. THFA is preferable to NMP in some respects and less desirable in others. It is preferable to NMP because of its lower cost and because it is derived from renewable resources. (THFA is made from FA, which is made from processing corn cobs and oat hulls). It is less desirable than NMP because its rate of action in paint removal is on the order of three to four times slower than NMP at ambient temperatures. THFA shares with NMP the properties of low flammability, ease of cleaning, water solubility, and low toxicity to humans and the environment. It would be desirable, therefore, to accelerate the rate of paint-removal action of THFA without detracting from the aforementioned beneficial properties, thereby providing an attractive substitute for NMP.

It has been unexpectedly discovered that the lower alkyl ethers of THFA disclosed herein accomplish this task. In accordance with the present invention, it has been found that lower alkyl ethers of THFA have paint stripping qualities and when used in combination with NMP, accelerate the rate of paint removal from wood and metal surfaces relative to using THFA or NMP alone.

It is also recognized that the paint stripping composition of the present invention may optionally be combined with formic acid as an accelerating agent to remove aged coatings, a surfactant wetting agent, a thickener to aid in application and adherence to vertical surface, a corrosion inhibitor to prevent flash rust of metal substrates due to the formic acid, a fragrance to improve the odor, and a bittering agent to prevent ingestion by children. Conventional compounds of these types may be used in combination with the present invention.

DETAILED DESCRIPTION OF THE PREFERRED EMBODIMENTS

A novel feature of the present invention is tetrahydrofurfuryl alcohol ethers, namely the methyl, ethyl and propryl ethers of tetrahydrofurfuryl alcohol that can be used as a paint stripping composition. A preferred embodiment of the present invention is the use of a combination of an alkyl ether of tetrahydrofurfuryl alcohol and N-methyl-2-pyrrolidone (NMP) as a paint stripping composition that are effective not only on consumer type paints which include alkyd and latex products but are also effective on two part urethane and epoxy coatings. The methyl, ethyl and propyl ethers of THFA may be used above as a paint stripping composition. All references to percent compositon are intended to mean percent by weight.

Preferably, the THFA ether may comprise 33–100% of the paint stripping compositions. More preferably, it may comprise 25–50% by weight of the composition. A preferred embodiment comprises a THFA ether in combination with NMP.

A number of other commercial additives may be used in combination with the THFA ether. Such commercial additives include solvents or diluents, formic acid, surfactants, fragrance, thickener, bittering agent, and corrosion inhibitors. Formic acid is used as an accelerating agent for the removal of aged coatings from wood and metal substrates. Formic acid may be included in the stripper formulation preferably in concentrations of 0–10%.

Solvents or diluents may be conventional in the art, for example, glycol ethers, glycol ether esters and carbonates, etc. They may be present in concentrations of 0–50% and more preferably 0–25%.

Surfactants are used to give good wetting of the composition to the surface being stripped, help provide good water rinsability once stripping is completed and be biodegradable (if possible) to have a minimum effect on the environment. Non-ionic types are commonly chosen for stripping application. A suitable example of a functional surfactant is the Emulphoghene series of surfactants (Rhone-Poulenc) which are ethoxylates of tridecyl alcohol. The surfactant may be included in the stripper formulation preferably in concentrations of 0–1%.

A corrosion inhibiter may also be included in the inventive formulation. The corrosion inhibitors that can be used are commonly used as additives for applications with metallic substrates to help prevent flash rusting. The other key requirement is that they be compatible in the stripping composition. Examples of the types that can be used are Petroleum Sulfonates (e.g. Alox 575 from Alox Corporation), mono-, di-, and triethanol amines, and amino methyl propane ("AMP 95" from Angus Chemical). When included in the present formulation, the corrosion inhibiter may be present in concentrations of 0–3%, and preferably 0–1.5%.

Thickeners are used in the invention to provide enough viscosity for the formulation to be able to cling to vertical surfaces while stripping paint. While they must be compatible in the formulation, they must also be water soluble and rinsable to have the greatest effectiveness and not to leave a film on the surface being stripped. We have found that the most effective thickeners are of the hydroxypropylcellulose type. These are reaction products of alkali cellulose and propylene oxide and have a molecular weight of about 1,000,000. Commercial examples of suitable thickeners are "Klucel H"(Aqualon Company) and "Bermocoll OS"(Berol Nobel). When included in the present invention, the thickening agent may be used in concentrations of 0–2%, and preferably 0–0.5%.

A bittering agent may be added as a safety precaution against ingestion by children. The bittering agent may be present in concentrations sufficient to confer a bitter taste on the formulation. The preferred concentration of bittering agent is 0–0.005%. The bittering agent preferred for the invention is one commonly used in products that are formulated to deter children from ingesting household chemical products. It's chemical designation is denatonium benzoate. Two examples of commercial names for these products are "Bitrex"(Henley Chemicals Inc.) and "Vilex"(Atomergic Chemetal Corporation).

Fragrances are optional additives that can be used if there is a situation where the odor of the product might be considered to be offensive. This may be the case in formulations that contain formic acid or when stripping is done indoors. There is nothing special about the fragrance used except that it gives the proper level of odor masking and is compatible in the formulation. An example of a suitable fragrance is "Woodland Scent LD 422-1" by J. Manheimer Inc. The fragrance may be present in concentrations of preferably 0–5%.

Of course, the combination of commercial additives described above should be chosen so as not to interfere with the paint stripping qualities of the present invention.

While combinations of the THFA ethers and the preferred co-solvents provide a safe and effective paint stripper, addition of N-methypyrrolidone (NMP) enhances the invention's beneficial properties, such as low flammability and speed of performance, but does not detract from other desired properties. NMP may be present in the formulation of the present invention in concentrations of 0–50%, and is preferably present in concentrations of 25–50% by weight.

The preferred embodiment of the present invention contains 25–50% THFA ether, 25–50% NMP solvent, 0–10% formic acid, 0–5% surfactant, 1–3% fragrance, 0–1.5% thickener, 0–0.005% bittering agent, and 0–3% corrosion inhibitor and has a viscosity in the range 1000 to 5000 centipoise.

The present invention is manufactured by slowly adding thickener to the THFA ether (and NMP, if used) with agitation until the mixture gels. The remaining ingredients may then be added. The resulting gel is clear and has a viscosity from about 1000 to 5000 centipoise, providing good adhesion to horizontal and vertical surfaces. When applied to wood and metal surfaces, the composition of the present invention is effective at ambient temperatures in removing, for example, oil based alkyd and latex paints, varnishes, lacquers, shellacs, enamels, polyurethane and epoxy coatings.

The product, either the THFA ether or in combination with NMP, is an effective paint stripper having a flash point above 100° F, rendering it non-flammable and having little odor.

EXAMPLE 1

Cold rolled steel panels (6"×12") were painted using a medium oil-based alkyd paint (industrial enamel), a two component high solids industrial topcoat polyurethane paint, and a two component industrial topcoat epoxy paint. All paints are products of Rust-Oleum Corporation. Five drops (as applied by an eye dropper) of the mixture to be tested were placed onto the paint film and time to visual bubbling and lifting of the paint film was recorded. The following Tables 1, 2 and 3 show that either alone or in combination with N-Methyl Pyrrolidone that tetrahydrofurfuryl based ethers are as effective as paint strippers. In fact there is an unexpected synergistic effect with N-Methyl Pyrrolidone that results in better performance than either material alone, especially when stripping polyurethane paint and epoxy paint.

TABLE 1

Average Strip Time (Minutes)
(2–3 mil (DFT) Dry Film Thickness)

| Solvent | Test 1 | Test 2 | Test 3 | Test 4 |
| --- | --- | --- | --- | --- |
| N-Methyl Pyrrolidone | 32 | 19 | 23 | 36 |
| Tetrahydrofurfuryl Methyl Ether (THFAOMe) | 20 | 25 | 35 | 42 |
| Tetrahydrofurfuryl Ethyl Ether (THFAOEt) | — | 56 | >120 | >120 |
| Tetrahydrofurfuryl Propyl Ether (THFAOPr) | — | — | — | >120 |
| THFAOMe/NMP (50/50 Blend) | 11 | 17 | 18 | 21 |
| THFAOEt/NMP (50/50 Blend) | — | 14 | 15 | 25 |
| THFAOPr/NMP (50/0 Blend) | — | — | — | 35 |

TABLE 2

Topcoat Polyurethane Paint
Average Strip Time (Minutes)

| Solvent | (1.7 mil DFT) Test 1 | (2.5–3.0 mil DFT) Test 2 | (2.5–3.0 mil DFT) Test 3 | (0.8–0.9 mil DFT) Test 4 |
|---|---|---|---|---|
| N-Methyl Pyrrolidone | 9 | 98 | >120 | 16 |
| Tetrahydrofurfuryl Methyl Ether (THFAOMe) | 10 | 45 | 58 | 21 |
| Tetrahydrofurfuryl Ethyl Ether (THFAOEt) | — | 80 | >120 | >120 |
| Tetrahydrofurfuryl Propyl Ether (THFAOPr) | — | — | — | >120 |
| THFAOMe/NMP (50/50 Blend) | 7 | 49 | 58 | 10 |
| THFAOEt/NMP (50/50 Blend) | — | 53 | 85 | 13 |
| THFAOPr/NMP (50/0 Blend) | — | — | — | 17.5 |

TABLE 3

Medium Oil Based Alkyd Paint
Average Strip Time (Minutes)

| Solvent | Test 1 (1.8–2.2 mil DFT) | Test 2 (1.8–2.2 mil DFT) | Test 3 (0.9–1.0 mil DFT) | Test 4 0.9–1.0 mil DFT |
|---|---|---|---|---|
| N-Methyl Pyrrolidone | 5.0 | 5.0 | 0.83 | 1.08 |
| Tetrahydrofurfuryl Methyl Ether | 3.3 | 3.6 | 0.75 | 0.92 |
| Tetrahydrofurfuryl Ethyl Ether | 7.6 | — | 2.30 | 2.83 |
| Tetrahydrofurfuryl Propyl Ether | | | | 9.0 |
| THFAOMe/NMP (50/50 Blend) | 3.6 | 3.8 | 0.83 | 0.92 |
| THFAOEt/NMP (50/50 Blend) | 4.4 | — | 1.10 | 1.42 |
| THFAOPr/NMP (50/50 Blend) | | | | 1.50 |

Using the testing procedure described above, another series of testing was done to illustrate the effectiveness of 3–5 carbon aliphatic glycol ethers, ether ester, and carbonate solvents as diluents for Tetrahydrofurfuryl ethers in stripping medium oil based alkyd paint. Notice that the binary blends with the THFA ethers still perform as well as NMP.

TABLE 4

Medium Oil Based Alkyd Paint
Average Strip Time (Minutes)

| Solvent (Neat) | Test 1 (2.5–3.0 mil DFT) THFAOMe | Test 2 (2.5–3.0 mil DFT) THFAOEt | No. of Carbons in Diluent | 2766 Test 3 (3.0 mil DFT) THFAOPr |
|---|---|---|---|---|
| THFAOMe | 3.8 | 5.3 | — | 7.8 |
| THFAOEt | — | 13.5 | — | 20.0 |
| NMP | 5.5 | 7.0 | — | 10.1 |
| THFAOPr | | | | 46.0 |
| 50/50 Tetrahydrofurfuryl Ether Blend with Diluents | | | | |
| Dimethyl Carbonate | 3.8 | 7.1 | 3 | 23.7 |
| 2-Methoxy Ethanol | 5.1 | 6.1 | 3 | 17.0 |
| Methyl Methoxy Acetate | 4.6 | 6.5 | 4 | 19.0 |
| Ethyl Methoxy Acetate | 5.5 | 7.1 | 4 | 20.9 |
| Methyl Methoxy Propionate | 5.8 | 8.5 | 5 | 23.4 |
| 2-Methoxyethyl Acetate | 6.0 | — | 5 | 21.3 |

It should be understood that the foregoing disclosure emphasizes certain specific embodiments of the invention and that all modifications or alternative equivalents thereto are within the spirit and scope of the invention as set forth in the appended claims.

What is claimed is:

1. A method for removing a paint film from a surface comprising the steps of
    (a) applying an effective amount of a paint stripping composition to said paint film on said surface, said stripping composition comprising a mixture including at least about 25% by weight tetrahydrofurfuryl alkyl ether, at least about 25% to 50% by weight solvent taken from the group consisting of N-methyl pyrrolidone, glycol ethers, glycol ether esters, carbonates and mixtures thereof, and one or more additives from a group consisting of 0% to 10% by weight formic acid, 0% to 1% by weight surfactant, 0% to 3% by weight corrosion inhibitor, 0% to 2% by weight thickener, 0%–0.005% by weight bittering agent and 0% to 5% by weight fragrance in a liquid mixture having a viscosity in the range of about 1000 to about 5000 centipoise;
    (b) allowing the composition to sit on the paint film; and
    (c) lifting and removing the paint film from the surface.
2. The method of claim 1 including application of said composition wherein said composition includes an ether selected from the alkyl group consisting of methyl, ethyl and propyl.
3. The method of claim 1 including application of said composition wherein said composition includes tetrahydrofurfuryl methyl ether and N-methyl pyrrolidone.
4. The method of claim 1 including application of said composition wherein said composition includes tetrahydrofurfuryl ethyl ether and N-methyl pyrrolidone.
5. The method of claim 1 including application of said composition wherein said composition includes tetrahydrofurfuryl propyl ether and N-methyl pyrrolidone.
6. The method of claim 1 including application of said composition wherein said composition comprises a blend of equal amounts of tetrahydrofurfuryl alkyl ether and N-methyl pyrrolidone.
7. The method of claim 1 including application of said composition wherein said composition comprises a blend of tetrahydrofurfuryl ether and a solvent taken from the group consisting of dimethyl carbonate, 2-methoxy ethanol, methyl methoxy acetate, ethyl methoxy acetate, methyl methoxy propionate and 2-methoxy ethyl acetate.
8. The method of claim 1 including application of said composition wherein said composition comprises equal amounts of said tetrahydrofurfuryl ether and said solvent.
9. The method of claim 1 comprising applying said composition at ambient temperature.

* * * * *